March 21, 1939. D. A. WIGHT 2,150,999

TOW AND PUSH CLAMP

Filed July 13, 1938

Inventor
Darahl A. Wight.

By
Samuel H. Davis.
Attorney

Patented Mar. 21, 1939

2,150,999

UNITED STATES PATENT OFFICE 2,150,999

TOW AND PUSH CLAMP

Darahl A. Wight, Lansing, Mich.

Application July 13, 1938, Serial No. 219,037

4 Claims. (Cl. 280—33.14)

This invention relates to contrivances which may be termed tow and push clamps. The purpose of this invention is to provide a particularly strong and simple clamp coupling which may be conveniently and quickly applied to join the rear bumper of one automobile and the front bumper of a second automobile, in order that one may tow or push the other. It is sometimes necessary when a machine fails in some part, to tow it along or to push it for a distance, and it is desirable that the connecting devices shall be such as may be applied by any one, which will not get out of order, and which will withstand hard usage indefinitely.

It is the object of this invention to produce a tow and push clamp of special construction and arrangement of parts, as illustrated in the accompanying drawing, forming a portion of this application.

Throughout the drawing and description the same number is used to refer to the same part.

Figure 2:
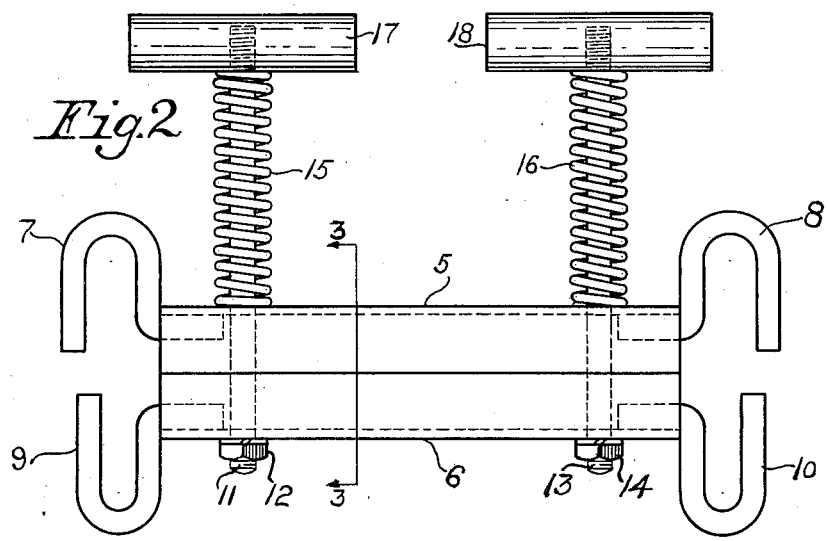
Fig. 2 is an enlarged side view showing the invention detached, and all parts thereof assembled.
Figure 3:
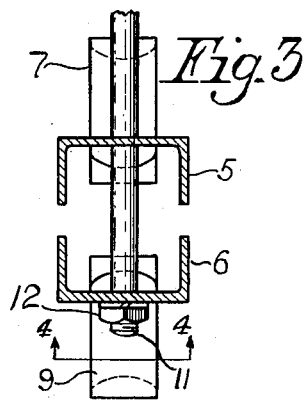
Fig. 3 is a sectional view taken along a line 3—3 of Fig. 2.

As best shown in Fig. 2, there is provided an upper clamp member 5, and a lower clamp member 6. These members are as usually constructed hollow straight bodies as shown in the sectional Fig. 3, with vertical sides and an outer flat portion integrally connecting the sides. The members are aligned one over the other with the hollow or internal spaces presented to each other.

Figure 1:
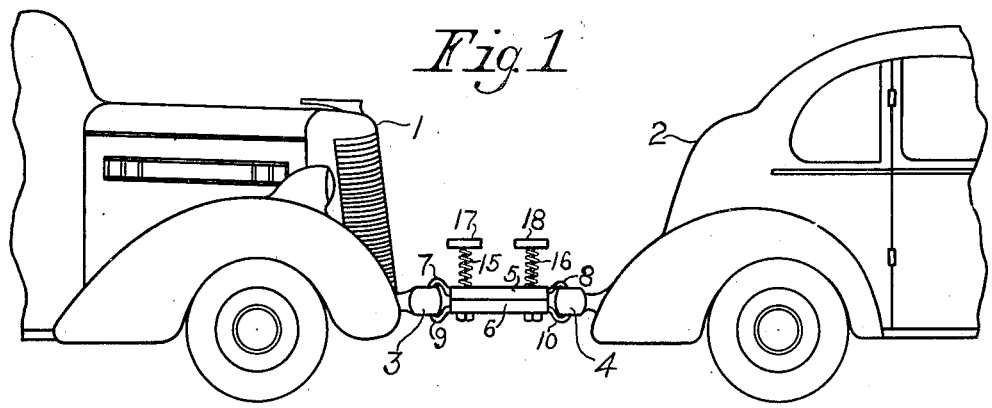
Fig. 1 represents the forward end of one automobile and the rearward portion of a second automobile coupled by this said invention.

The members are placed between the ends 1 and 2 of the automobiles and in engagement with the bumpers 3 and 4, as shown in Fig. 1. It is not intended to limit the invention to an engagement solely with the bumpers, as other attaching devices may be substituted. To make the desired connection with the edges of the bumpers, the upper member is provided with the hooks 7 and 8 opening downwardly, and the lower member has corresponding hooks 9 and 10. The hooks are attached at the ends of the members as best shown in Fig. 2.

Passing through both members are rods having their lower ends screw threaded. Thus, rod 11 at its threaded end has a nut 12, and the fellow rod 13 at its lower end has the nut 14.

Figure 4:
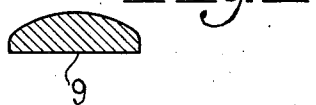
Fig. 4 is a sectional view taken along the line 4—4 of Fig. 3.

It will be noted that the nuts contact with the bottom surface of the lower clamp member 6. The upper portions of the rods, above the upper member 5 are encircled by the coil springs 15 and 16, and it will be noted that the lower ends of the springs are in contact with the top of member 5 exteriorly. The upper ends of the coil springs contact with the transverse handpieces 17 and 18. The hooks are made very strong, usually having the cross section set out in Fig. 4. As ordinarily constructed, the hooks of the upper member, opening downwardly, have a somewhat wider opening than the hooks of the lower member which open upwardly.

The operation of this invention will be readily understood from Figs. 1 and 2. When it is desired to couple the bumpers of the automobiles, one of the handpieces is grasped and forced downwardly compressing the coil spring between the handpiece and the top of the upper clamp member. As the rod is usually fitted somewhat tight in the lower member, the members are separated. The reason for making the hooks of the upper member opening downwardly somewhat wider than the lower member hooks is to increase the convenience of slipping the hooks of the upper member over the edge of the bumper, after which the normal extension of the spring will hook the lower member hook over the lower edge of the bumper as illustrated in Fig. 1. A like operation engages the hooks at the other ends of the clamp members with the bumper of the second vehicle.

Having now described this invention and the manner of its use, I claim:

1. A tow and push clamp, comprising upper and lower clamp members, the said upper member being provided at its ends with hooks attached to the member and opening downwardly, the said lower member being provided at its ends with hooks attached to the member and opening upwardly, spaced screw threaded rods passing through both said members, said rods having encircling coil springs arranged above said upper clamp member, one end of each spring being in contact with said upper member, each of said rods having a nut thereon below the said lower member, and means on said rods arranged against the upper ends of said springs whereby pressure exerted upon said rods will separate said members and the hooks thereon.

2. A tow and push clamp, comprising upper and lower clamp members, the said upper member being provided at its ends with devices opening downwardly and adapted to engage the edge of an automobile bumper, the said lower member being provided with corresponding devices opening upwardly, spaced screw threaded rods passing through both of the said members, said rods having encircling coil springs above the said upper member and in contact with the said upper member, each of the said rods having a handpiece secured at the top of the rod, the upper ends of the coil springs being in contact with the said handpieces, the said rods having nuts on their lower ends below the said lower member whereby the said handpieces may be operated to compress the said springs and separate the said clamp members.

3. A tow and push clamp, comprising upper and lower clamp members, each of said members being a straight open body having spaced sides and a flat outer portion integrally connecting said sides, the said members being aligned one over the other with the hollow portions presented to each other, the said upper member being provided at its ends with hooks attached to the member and opening downwardly, the said lower member being provided at its ends with hooks attached to the member and opening upwardly, spaced screw threaded rods passing through both said members, said rods having encircling coil springs arranged above the upper clamp member, one end of each spring being in contact with the exterior of said flat portion of the upper member, each of said rods having a nut upon its lower end in contact with the exterior of the flat portion of the lower member, and means upon said rods against the upper ends of said springs whereby pressure upon the rods will separate the said members.

4. A tow and push clamp, comprising upper and lower clamp members, the said upper member being provided at its ends with hooks attached to the member and opening downwardly, the said lower member being provided at its ends with hooks attached to the member and opening upwardly, the opening of the said hooks of the upper member being wider than the corresponding openings in the hooks of said lower member, spaced screw threaded rods passing through both of said members, said rods having encircling springs arranged above said upper clamp member, one end of each spring being in contact with the said upper member, each of the said rods having a nut thereon below said lower member, and means on said rods arranged against the upper ends of said springs whereby pressure upon said rods will separate the said members and the hooks thereon.

DARAHL A. WIGHT.